Figure 1:
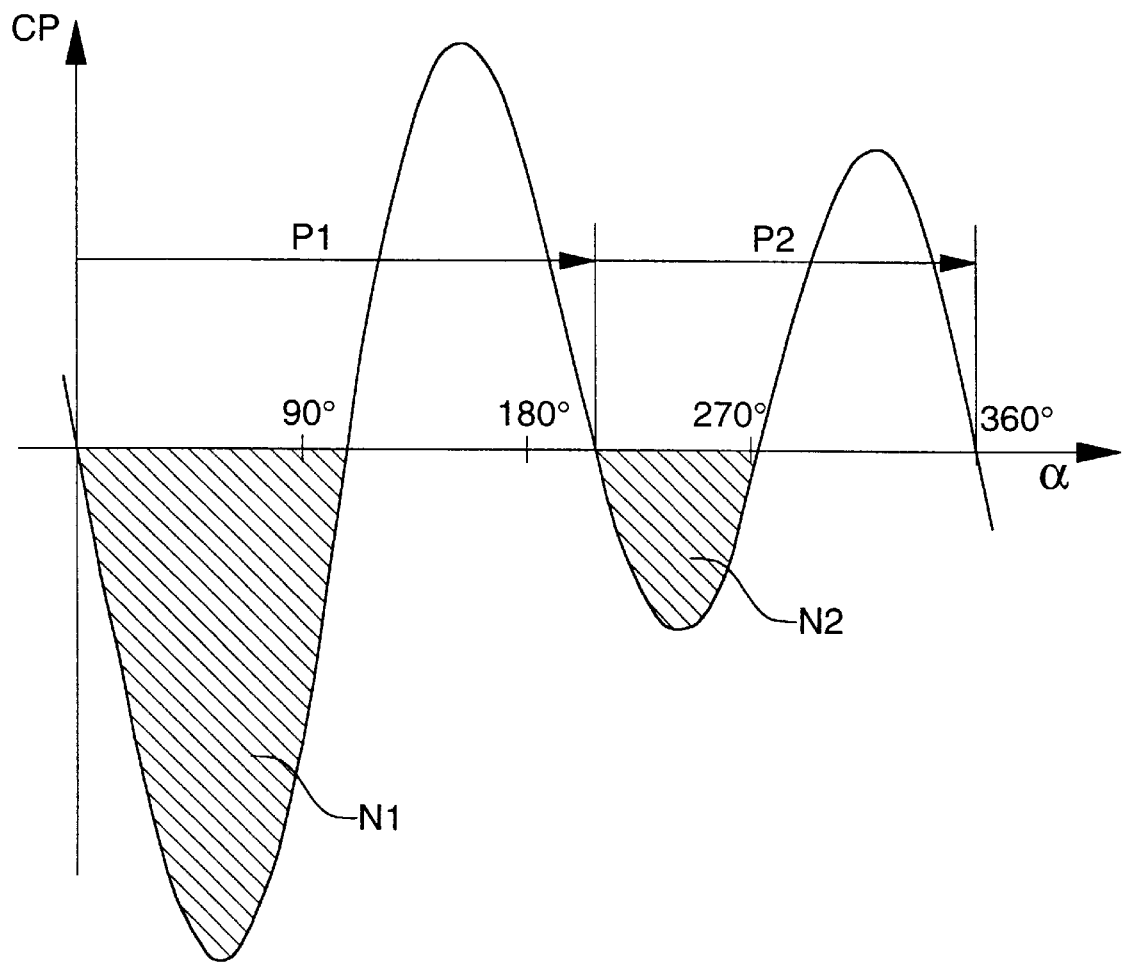

United States Patent
Guérin et al.

[19]

[11] Patent Number: 6,025,690
[45] Date of Patent: Feb. 15, 2000

[54] METHOD AND DEVICE FOR CONTROLLING A STEPPING MOTOR

[75] Inventors: Yves Guérin, St-Louis, France; Rudolf Bugmann, Erlach, Switzerland

[73] Assignee: Eta Sa Fabriques d'Ebauches, Grenchen, Switzerland

[21] Appl. No.: 09/377,494

[22] Filed: Aug. 20, 1999

[30] Foreign Application Priority Data

Aug. 25, 1998 [EP] European Pat. Off. ............. 98115990

[51] Int. Cl.$^7$ ............................... G04C 3/14; H02P 8/02; H02P 8/34
[52] U.S. Cl. ............................................ 318/685; 368/85
[58] Field of Search .................................. 318/685, 696, 318/599; 368/85, 86, 217, 218

[56] References Cited

U.S. PATENT DOCUMENTS

| | | | |
|---|---|---|---|
| 4,212,156 | 7/1980 | Kawamura et al. | 368/85 |
| 4,467,255 | 8/1984 | Xuan | 318/696 |
| 4,518,906 | 5/1985 | Ueda | 318/696 |
| 5,247,235 | 9/1993 | Tu et al. | 318/685 |

FOREIGN PATENT DOCUMENTS

| | | |
|---|---|---|
| 2026216 | 1/1980 | United Kingdom . |
| 2067795 | 7/1981 | United Kingdom . |

*Primary Examiner*—Bentsu Ro
*Attorney, Agent, or Firm*—Sughrue, Mion, Zinn, Macpeak & Seas, PLLC

[57] ABSTRACT

The method includes applying to the coil (3) of the motor (2) driving pulses having alternately a first and a second polarity, supplying the coil (3) with a determined quantity of electric energy during each driving pulse, detecting, after each driving pulse, the rotation or non rotation of the rotor of the motor (2) in response to said driving pulse, and adjusting said determined quantity of electric energy as a function of said detection.

In order to further reduce the quantity of electric energy consumed by the motor, the method is characterised in that the adjustment of the quantity of electric energy supplied to the coil (3) is effected separately for the driving pulses having the first polarity and for the driving pulses having the second polarity.

3 Claims, 2 Drawing Sheets

METHOD AND DEVICE FOR CONTROLLING A STEPPING MOTOR

The present invention concerns a method for controlling a stepping motor having a rotor provided with a permanent magnet, a coil and a stator for magnetically coupling said coil and said magnet, including:

application to said coil of successive driving pulses having alternately a first polarity and a second polarity opposite to said first polarity, and the supply of a determined quantity of electric energy to said coil during each of said driving pulses;

detection, after each of said driving pulses, of the rotation or non rotation of said rotor in response to said driving pulse; and adjustment of said quantity of energy as a function of said detection.

The present invention also concerns a device for implementing this method, i.e. a device for controlling a stepping motor having a rotor provided with a permanent magnet, a coil and a stator for magnetically coupling said coil and said magnet, said device including:

means for generating driving pulses for applying to said coil successive driving pulses having alternately a first polarity and a second polarity opposite to said first polarity and for providing said coil with a determined quantity of electric energy during each of said driving pulses;

detection means for providing, after each of said driving pulses, a detection signal representative of the rotation or non rotation of said rotor in response to said driving pulse;

adjustment means responding to said detection signal to adjust said quantity of electric energy.

A method and device of this type, which are in particular disclosed in U.S. Pat. No. 4,212,156 are intended to allow a reduction in the total electric energy consumed by a stepping motor. Such a reduction is particularly desirable when the stepping motor is used in a device which is portable and/or of small volume, an electronic timepiece for example. All other things being equal, this reduction in the power consumption of the stepping motor allows the life of the electric power source which supplies the device, generally formed of a battery, to be increased or the volume occupied by such source to be reduced.

In order to allow the quantity of electric energy consumed by the stepping motor to be reduced, the aforementioned known method consists, when the motor rotor has rotated correctly in response to a certain number of driving pulses, in reducing the quantity of electric energy which will be supplied to the motor coil during the following driving pulses. Moreover, this method consists, when the motor rotor has not rotated correctly in response to a driving pulse, in applying to the motor coil a correction pulse during which the quantity of electric energy supplied to the coil is sufficient for the rotor to make the step which it has just missed, and in increasing to a maximum the quantity of electric energy which will be supplied to the coil during the following driving pulses.

As a result, if the motor rotor has not rotated in response to a driving pulse for any reason, the quantity of electric energy supplied to the motor coil during the following driving pulse is bound to its maximum value.

It can be seen that this known method in principle allows the quantity of electric energy actually supplied to the motor coil to be close to its minimum value, i.e. the value of the electric energy which must at least be supplied to the coil for the rotor to rotate correctly.

It is well known however that certain dimension and/or positioning tolerances must be allowed during the manufacture and assembly of the various components of a stepping motor.

Thus, for example, it can happen that the axis of magnetisation of the rotor of such a motor does not intersect the axis of rotation of said rotor. Likewise, this axis of rotation does no always coincide exactly with the axis of opening of the stator in which the rotor magnet is situated, nor with the axis of the cylinder formed by this magnet.

In such cases, the variation in the positioning couple to which the stepping motor rotor is subjected as a function of its angular position is different according to the step which the rotor makes.

It can also happen that the axis of magnetisation of the rotor magnet of a stepping motor is not exactly perpendicular to the axis of the cylinder formed by this magnet. In such a case, one of the magnetic poles of the magnet is obviously closer to one of the end faces of the cylinder than the other, the second of these magnetic poles being then closer to this other end face than the first.

In such a case, the effect of the presence of a part made of ferromagnetic material, for example the toothed wheel which meshes with the pinion of the rotor, facing and in proximity to one portion of one of the end faces of the rotor is also that the variation in the positioning couple applied to the rotor is different according to the step made by the rotor.

It can also happen that a stepping motor is subjected to a continuous external magnetic field. In such a case, the variation in the positioning couple applied to the motor rotor is also different according to the step made by the rotor.

FIG. 1 shows an example of the variation in the positioning couple CP to which the rotor of a stepping motor is subjected in one and/or the other of the aforementioned cases as a function of the angular position $\alpha$ of said rotor.

In FIG. 1 the two stable rest positions of the rotor are respectively designated R1 and R2. Moreover, the steps which the rotor makes when it rotates from position R1 to position R2 and from position R2 to position R1 are respectively designated P1 and P2.

Those skilled in the art knows very well that the driving pulses intended to cause the motor rotor to make a step P1 and those which are intended to cause the rotor to make a step P2 must have opposite polarities. In the following description, these driving pulses will be respectively arbitrarily termed positive and negative.

It will be noted in FIG. 1 that stable rest positions R1 and R2 of the motor rotor are not exactly diametrically opposite, the rotor rotating more than 180° when it makes its step P1 and less than 180° when it makes its step P2.

But it will be noted in particular that the surface delimited by the axis $\alpha$ and the curve representing the negative part of positioning couple CP, i.e. the part of couple CP where it opposes the rotation of the rotor, is significantly greater, in this example, when the rotor makes its step P1 than when it makes its step P2.

In FIG. 1, these two surfaces are hatched and respectively designated N1 and N2.

Those skilled in the art know that, in very many cases and in particular when a stepping motor is used in a timepiece, the minimum quantity of electric energy which must be supplied to the coil of the motor for its rotor to make a step depends almost exclusively, most of the time, on the size of this surface.

In the present example, this minimum quantity of electric energy is thus, in all these cases and most of the time, significantly higher when the stepping motor rotor has to make a step P1 than when it has to make a step P2.

It can be seen that when such a motor is controlled in accordance with the known method described hereinbefore, the quantity of electric energy supplied to its coil during each driving pulse cannot be less than that which is necessary for the rotor of said motor to correctly make its steps P1 in response to the positive driving pulses. As a result the quantity of electric energy supplied to the coil of the motor during each of the negative driving pulses is always significantly higher to that which is necessary for the motor rotor to correctly make its steps P2. The excess quantity of electric energy supplied to the motor coil during each negative driving pulse is obviously dissipated in pure waste.

It can also happen that the reason for which the rotor of the motor has not rotated in response to a driving pulse no longer exists at the moment when the following driving pulse is applied to the coil.

Thus, for example, the motor rotor cannot rotate in response to a driving pulse because of a shock undergone by the motor during this driving pulse.

Again by way of example, the motor rotor can also not rotate in response to a driving pulse because of a fault in one of the wheels of the gear train driven by the rotor. According to the position of this wheel in the gear train, this fault may only cause non rotation of the rotor again after quite a large number of driving pulses have been applied to the coil.

In all these cases also, the quantity of electric energy supplied to the motor coil during the driving pulses following that in response to which the rotor has not rotated and having the opposite polarity to the polarity of the latter is unnecessarily high, a significant portion of this electric energy being also then dissipated in pure waste.

The known method described hereinbefore, as well of course as any device implementing this method, thus does not allow the quantity of electric energy consumed by a stepping motor to be reduced as much as would be desirable.

An object of the present invention is thus to provide a method for controlling a stepping motor which allows the quantity of electric energy consumed by the stepping motor to be reduced further than is allowed by the known method described hereinbefore.

This object is achieved by the method of claim 1.

Another object of the present invention is to provide a device for implementing the method of claim 1.

This object is achieved by the device whose features are listed in claim 2.

Figure 2:
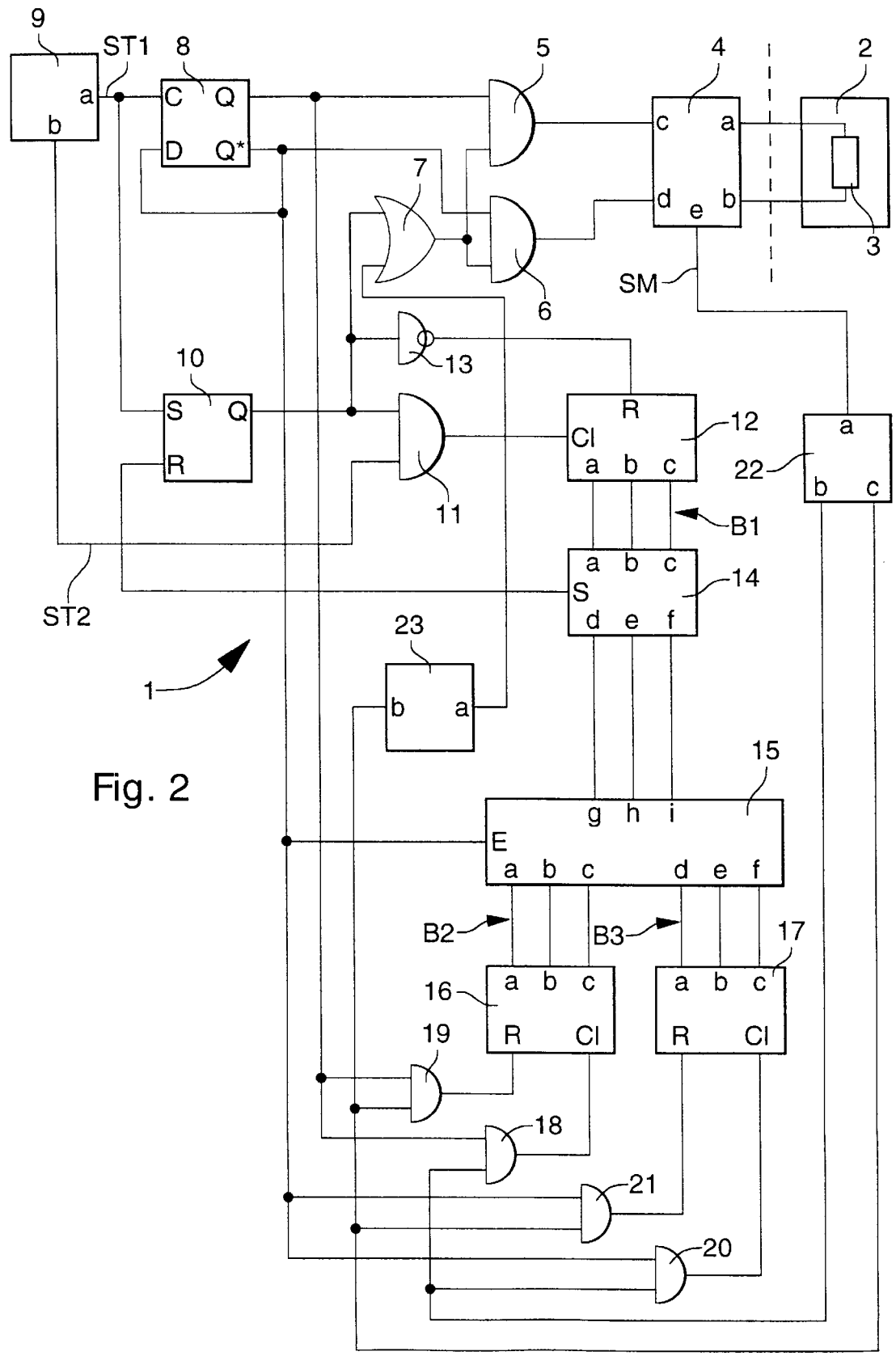

Other objects and advantages of the present invention will become clear from the description which will be given hereinafter with reference to the annexed drawings, in which:

FIG. 1, already mentioned, shows an example of the variation in the positioning couple to which the rotor of a stepping motor is subjected, in numerous cases, as a function of the angular position of said rotor; and FIG. 2 shows schematically and by way of non-limiting example, an embodiment of the device according to the present invention.

In the embodiment shown in FIG. 2, the device according to the present invention, designated by the general reference 1, is intended to be used in an electronic timepiece having mechanical time display means, for example hands, for controlling the stepping motor which drives said means.

This stepping motor, which has also been shown schematically in FIG. 1 with the reference 2, includes in this example a single coil, a rotor having a bipolar permanent magnet, a stator magnetically coupling the coil and the rotor magnet, and means which subject the rotor to a positioning couple which tends to keep it or return it to one or other of the two stable rest positions. Only the coil of motor 2 has been shown, with the reference 3.

Those skilled in the art will however easily understand that the present invention is not limited to the control of a stepping motor of this type, but can be used for controlling a stepping motor of any other type, whatever the number of its coils, the number of magnetic poles of the permanent magnet of its rotor and the number of stable rest positions of the latter. Those skilled in the art will also see that the present invention is not limited to the control of a stepping motor of a timepiece either, but can be used for controlling a stepping motor forming part of any other type of device.

Those skilled in the art know very well that, in order to control a stepping motor of the type described hereinbefore, driving pulses having alternately a first polarity and a second polarity opposite to the first must be applied to its coil, these driving pulses being, according to the particular case, of the type called constant voltage pulses or of the type called constant current pulses.

As hereinabove, the driving pulses having the first polarity and the driving pulses having the second polarity will be arbitrarily termed respectively positive and negative in the following description.

Device 1 includes an amplifier 4 which will not be described in detail, since it is a well known circuit.

It will simply be mentioned that amplifier 4 includes two outputs 4a and 4b each connected to one of the terminals of coil 3. Amplifier 4 further includes two inputs 4c and 4d, and it is arranged, in this example, so as to supply coil 3 with a positive constant voltage driving pulse while its input 4c is in the "1" logic state and a negative constant voltage driving pulse while its input 4d is in the "1" logic state. Amplifier 4 is further arranged so as to short circuit coil 3 while its inputs 4c and 4d are both in the "0" logic state, i.e. from the end of one driving pulse until the beginning of the following driving pulse.

Amplifier 4 further includes an output 4e, and it is arranged so as to supply this output 4e with a measurement signal SM representative of the intensity of the current which is still passing through coil 3 after it has been short circuited at the end of a driving pulse.

Inputs 4c and 4d of amplifier 4 are respectively connected to the output of an AND gate 5 and to the output of a AND gate 6, these gates 5 and 6 both having an input connected to the output of an OR gate 7.

The second inputs of gates 5 and 6 are respectively connected to the direct output Q and to the inverting output Q* of a D type flip-flop 8.

Flip-flop 8 has a clock input C1 which is connected to the output 9a of a time base circuit 9 and a data input D which is also connected to its inverting output Q*.

Time base 9 will not be described in detail since it is a well known circuit. It will simply be mentioned that, in this example, it is arranged so as to supply, at its output 9a, a periodic signal ST1 formed by pulses having a frequency of 1 Hz. It will also be mentioned that time base 9 includes a second output 9b which supplies, again in this example, another periodic signal ST2 formed by pulses having a frequency of 1024 Hz.

Output 9a of time base 9 is also connected to the control input S of an R-S type flip-flop 10 whose direct output 0 is connected to a first input of an AND gate 11 and to a first input of gate 7. The second input of gate 11 is connected to output 9b of time base 9, and the output of this gate 11 is connected to the clock input C1 of a counter 12.

Counter 12 is formed of three flip-flops, not shown separately, which are connected in a conventional manner and whose direct outputs form outputs 12a, 12b and 12c of counter 12.

Counter 12 also includes a zero reset input R which is connected to the output Q of flip-flop 10 via an inverter 13.

Again in a conventional manner, the three outputs 12a, 12b and 12c of counter 12 are kept in the "0" logic state while input R of this counter 12 is in the "1" logic state, i.e. while output Q of flip-flop 10 is in the "0" logic state.

Likewise, when input R of counter 12 is in the "0" logic state, the binary number formed by the "0" or "1" logic states of outputs 12a, 12b and 12c increases by one unit in response to each pulse provided to input C1 of counter 12, in a way which will be specified hereinafter, via the output of gate 11. This binary number, which will be designated B1, can thus vary from 000 to 111.

Device 1 further includes a binary comparator 14 having three first inputs 14a, 14b and 14c respectively connected to outputs 12a, 12b and 12c of counter 12. This comparator 14 also includes three second inputs 14d, 14e and 14f, as well as an output S which is connected to the zero reset input of flip-flop 10.

Comparator 14 will not be described in detail since it is a well known circuit. It will simply be mentioned that its output S only takes the "1" logic state when the two binary numbers formed by the "0" or "1" logic states of its inputs 14a, 14b and 14c on the one hand and its inputs 14d, 14e and 14f on the other hand are equal. In all other cases, this output of comparator 14 is in the "0" logic state.

Device 1 also includes a switch 15 having three first inputs 15a, 15b and 15c, three second inputs 15d, 15e and 15f, three outputs 15g, 15h and 15i respectively connected to inputs 14d, 14e and 14f of comparator 14, and a control input E connected to the inverting input Q* of flip-flop 28.

Switch 15 will not be described in detail here either since it is also a well known circuit. It will simply be mentioned that it is arranged so as to connect its outputs 15g, 15h and 15i to its first inputs 15a, 15b, 15c or to its second inputs 15d, 15e and 15f according to whether its input E is in the "0" logic state or the "1" logic state.

Device 1 further includes a counter 16 having three outputs 16a, 16b and 16c respectively connected to inputs 15a, 15b and 15c of switch 15, as well as a counter 17 having three outputs 17a, 17b and 17c respectively connected to inputs 15d, 15e and 15f of switch 15. Each of counters 16 and 17 further includes a clock input C1 and a zero reset input R.

Counters 16 and 17 are identical and are each formed of five flip-flops, not shown separately, which are connected in cascade in a conventional manner. However, it is the inverting outputs of the last three flip-flops of these counters 16 and 17 which form their outputs 16a to 16c, respectively 17a to 17c.

As a result, on the one hand, when input R of counter 16 or input R of counter 17 is in the "1" state, the logic states of outputs 16a to 16c, respectively 17a to 17c, form the binary number 111 which corresponds, as everyone knows, to the decimal FIG. 7.

As a result, on the other hand, when input R of counter 16 is in the "0" logic state, the input C1 of counter 16 must receive four successive pulses for the binary number formed by the "0" or "1" logic states of its outputs 16a to 16c to be reduced by one unit. This binary number will be designated B2.

Likewise when input R of counter 17 is in the "0" logic state, the input C1 of the counter 17 must receive four successive pulses for the binary number formed by "0" and "1" logic states of its outputs 17a to 17c to be reduced by one unit. This binary number will be designated B3.

For a reason which will easily be understood by those skilled in the art, counters 16 and 17 are further arranged so that binary numbers B2 and B3 cannot become lower than a determined minimum value, for example 011. These binary numbers B2 and B3 can thus vary, in circumstances which will be explained hereinafter, from 111 to 011, i.e. in decimal notation, from 7 to 3.

Clock input C1 and zero reset input R of counter 16 are respectively connected to the output of an AND gate 18 and to the output of an AND gate 19 each having a first input connected to the direct output Q of flip-flop 8. Moreover, clock input C1 and zero reset input R of counter 17 are respectively connected to the output of an AND gate 20 and to the output of an AND gate 21 each of these gates having a first input connected to the inverting output Q* of flip-flop 8.

Device 1 also includes a detector circuit 22 having an input 22a which is connected to output 4e of amplifier 4 and which thus receives signal SM representing the current which is still flowing in coil 3 after it has been short-circuited at the end of each driving pulse.

Those skilled in the art know very well that when the coil of a stepping motor is short-circuited after a driving pulse, the variation in the current which is still flowing in the coil is different according to whether or not the motor has rotated correctly, in response to the driving pulse. Those skilled in the art also know the various ways of analysing the differences in this variation and how to generate a detection signal representative of the rotation or non-rotation of the rotor.

Detector 22 will thus not be described in detail here. It will simply be mentioned that, in the present example, detector 22 includes two outputs 22b and 22c and that it is arranged so that the detection signal which it generates after each driving pulse is formed by a short pulse appearing at said output 22b or said output 22c according to whether the rotor of motor 2 has rotated correctly or not in response to said driving pulse.

Outputs 22b and 22c of detector 22 are connected to the second inputs of gates 18 and 20 and, respectively, to the second inputs of gates 19 and 21.

Device 1 further includes a pulse generator 23 having an output 23a connected to the second input of gate 7 and an input 23b connected to output 22c of detector 22.

Generator 23, which will not be described in detail since the realisation thereof poses no problem for those skilled in the art, is arranged so as to respond to each pulse which it receives at its input 23b by generating at its output 23a another pulse having a relatively long duration.

As will be made clear hereinafter, this duration is that which the correction pulse, which is applied to coil 3 each time that the rotor of motor 2 has not rotated correctly in response to a driving pulse and which is intended to make the rotor perform the step that it has just missed, must have. This duration is thus greater than that of the longest of the driving pulses applied to coil 3 but cannot be specified further here since it depends on several factors which can be different according to the particular case.

The operation of device 1 will not be described in full detail since those skilled in the art will have no difficulty in understanding it in the light of the explanations which were given hereinbefore.

It will simply be noted that each pulse of signal ST1 generated by time base 9 causes a change in the logic state of outputs Q and Q* of flip-flop 8.

Simultaneously, this pulse of signal ST1 causes output Q of flip-flop 10 to pass to the "1" state. As a result, input 4c or input 4d of amplifier 4 then passes to the "1" state according to whether it is output Q or output Q* of flip-flop 8 which has passed to the "1" state. Amplifier 4 thus begins to apply to coil 3 a driving pulse which is positive in the first case and negative in the second case. Moreover, still according to whether it is output Q or output Q* of flip-flop 8 which has passed to the "1" state, it is binary number B2 present at outputs 16a to 16c of counter 16 or binary number B3 present at outputs 17a to 17c of counter 17 which is applied to inputs 14d to 14f of comparator 14 via switch 15 whose input E is in the "0" state in the first case and in the "1" state in the second case.

In other words, inputs 14d to 14f of comparator 14 receive binary number B2 or binary number B3 according to whether the driving pulse applied to coil 3 by amplifier 4 is positive or negative.

The passing of output Q of flip-flop 10 to the "1" state further allows counter 12 to begin to count the pulses of signal ST2 which it then receives at its input C1 via gate 11. Binary number B1, which was previously equal to 000 since input R of counter 12 was in the "1" state, thus begins to increase.

When this binary number B1 becomes equal to binary number B2 or B3 present at inputs 14a to 14f of comparator 14 as was explained hereinbefore, output S of this comparator 14 passes to the "1" state. As a result, output 0 of flip-flop 10 again passes to the "0" state, as does input 4c or input 4d of amplifier 4 which was until then in the "1" state. The driving pulse which had begun to be applied to coil 3 in the manner described hereinbefore is thus then interrupted.

It can be seen that the duration of each positive driving pulse is determined by the value of binary number B2 present at outputs 16a to 16c of counter 16 during this positive driving pulse. Likewise, the duration of each negative driving pulse is determined by the value of binary number B3 present at outputs 17a to 17c of counter 17 during this negative driving pulse. In the present example, these durations can thus vary from 3 times to 7 times the duration of the period of signal ST2, namely from approximately 2.93 milliseconds to approximately 6.84 milliseconds.

It is known that the quantity of electric energy supplied to the coil of a stepping motor during a constant voltage driving pulse, as is the case in the present example, depends in particular on the duration of said driving pulse. In the present case, the quantity of electric energy supplied to coil 3 during a positive driving pulse or during a negative driving pulse thus depends on binary number B2 or, respectively, binary number B3. This quantity of electric energy cannot be specified further since it depends on other factors such as the supply voltage of the motor and the electric features of the latter. One can simply say that this quantity of electric energy has a minimum value when number B2, or B3 respectively, has its value 011, and a maximum value when number B2, or B3 respectively, has its value 111.

If a driving pulse which has just been interrupted in the manner described hereinbefore has caused correct rotation of the rotor of motor 2, output 22b of detector 22 generates a detection pulse, and this latter is supplied to clock input C1 of counter 16 or counter 17 according to whether this driving pulse was positive or negative, via gate 18, or respectively, gate 20. The content of this counter 16 or counter 17 is thus changed and, if necessary, binary number B2 or binary number B3 is reduced by one unit provided that it has not yet reached its minimum value 011.

If the driving pulse which has just been interrupted has not caused correct rotation of the rotor of motor 2, it is output 22c of detector 22 which generates a detection pulse. This detection pulse causes, on the one hand, the supply, via output 23a of generator 23, of a pulse of long duration, as was mentioned hereinbefore. This pulse of long duration in turn causes the application, via amplifier 4, to coil 3 of a correction pulse having the same long duration and having the same polarity as the driving pulse in response to which the rotor of motor 2 has not rotated.

This same detection pulse is also supplied to the zero reset input R of counter 16 or counter 17, according to whether said driving pulse was positive or negative, via gate 19, or gate 21 respectively.

Binary number B2 in the first case, or binary number B3 in the second case, then takes its maximum value 111 without the value of the other binary number being modified.

It can be seen that binary numbers B2 and B3 are modified, if necessary, independently of each other.

It therefore follows that the quantities of electric energy supplied to coil 3 during the positive driving pulses and during the negative driving pulses are also modified, if necessary, independently of each other, unlike a stepping motor which is controlled by a known device.

More precisely, and in other words, the rotation or non-rotation of the rotor of motor 2 in response to a driving pulse having a determined polarity for example positive, only affects the quantity of electric energy supplied to coil 3 during the following driving pulses having the same polarity, but has no effect on the quantity of electric energy supplied to coil 3 during the following driving pulses having the other polarity, i.e. negative polarity in this example.

Let us consider, by way of example, a case where the quantities of electric energy supplied to coil 3 during the positive and negative driving pulses both have their minimum values. If the rotor of motor 2 does not then rotate correctly, for whatever reason, in response to a positive driving pulse, for example, the quantity of electric energy supplied to coil 3 during the following positive driving pulses will actually be increased to its maximum value, but the quantity of electric energy supplied to coil 3 during the following negative driving pulses will not be modified. This latter quantity of electric energy will thus keep its minimum value as long as the rotor of motor 2 continues to rotate correctly in response to these negative driving pulses.

It can be seen that the unnecessary dissipation of electric energy which frequently occurs when a stepping motor is controlled according to a known method implemented by a known device and which is due to the fact that, when the rotor of this motor does not rotate in response to a driving pulse having a certain polarity, the quantity of electric energy supplied to the motor coil during the immediately following driving pulses having the reverse polarity is increased to its maximum value, is avoided when the motor is controlled by a device such as device 1 described hereinbefore.

It therefore follows that, all other things being equal, the implementation of the method according to the present invention by a device such as device 1 for controlling a stepping motor allows the life of the electric power source which supplies the equipment of which the motor forms part, to be increased, or the volume occupied by such source to be reduced, which constitutes a significant advantage of this method and this device with respect to known methods and devices.

It is obvious that numerous other embodiments of the device according to the present invention, implementing the same method and having the same advantages as device 1 described hereinbefore, can be achieved without thereby departing from the scope of the present invention.

In particular, a device according to the present invention can be achieved in the form of a microcomputer programmed in a suitable manner and provided with an interface capable of supplying the coil of the motor with the necessary electric energy during each driving pulse.

Likewise, a device according to the present invention can be arranged so that the driving pulses which it generates are constant current driving pulses. Those skilled in the art know very well that, in such case, the quantity of electric energy supplied to the coil of the motor can be modified by acting on the intensity of the current which is then flowing in this coil.

What is claimed is:

1. A method for controlling a stepping motor having a rotor provided with a permanent magnet, a coil and a stator for magnetically coupling said coil and said magnet, including:

application to said coil of successive driving pulses having alternately a first polarity and a second polarity opposite to said first polarity, and the supply of a determined quantity of electric energy to said coil during each of said driving pulses;

detection, after each of said driving pulses, of the rotation or non rotation of said rotor in response to said driving pulse; and adjustment of said quantity of energy as a function of said detection; said adjustment being effected separately for said driving pulses having said first polarity and for said driving pulses having said second polarity.

2. A device for controlling a stepping motor having a rotor provided with a permanent magnet, a coil and a stator for magnetically coupling said coil and said magnet, said device including:

means for generating driving pulses for applying to said coil successive driving pulses having alternately a first polarity and a second polarity opposite to said first polarity and for supplying said coil with a determined quantity of energy during each of said driving pulses;

detection means for supplying, after each of said driving pulses, a detection signal representative of the rotation or non rotation of said rotor in response to said driving pulse; and adjustment means responding to said detection signal to adjust said quantity of electric energy;

wherein said adjustment means are arranged so as to adjust said quantity of energy separately for said driving pulses having said first polarity and for said driving pulses having said second polarity.

3. A device according to claim 2, wherein said generating means include:

means for generating an alternating signal having alternately a first state and a second state, shaping means responding to said first state and to said second state of said alternating signal to apply to said coil said driving pulses having said first polarity and, respectively, said second polarity and responding to a determination signal for determining said quantity of energy;

and wherein said adjustment means include:

determining means having an input and arranged for generating said determination signal in response to a data signal applied to said input;

first storage means for storing a first stored signal and responding to said detection signal and to said first state of said alternating signal to modify said stored signal;

second storage means for storing a second stored signal responding to said detection signal and to said second state of said alternating signal to modify said second stored signal; and switching means responding to said first state and to said second state of said alternating signal to apply to said input said first stored signal, which then constitutes said data signal, and respectively said second stored signal, which then constitutes said data signal;

said quantity of energy being thus determined by said first stored signal during the driving pulses having said first polarity and by said second stored signal during the driving pulses having said second polarity.

* * * * *